May 31, 1932.  E. H. LANGE  1,861,018
AUTOMATIC POWER CONTROL MECHANISM FOR AUTOMOBILES
Filed Nov. 23, 1931
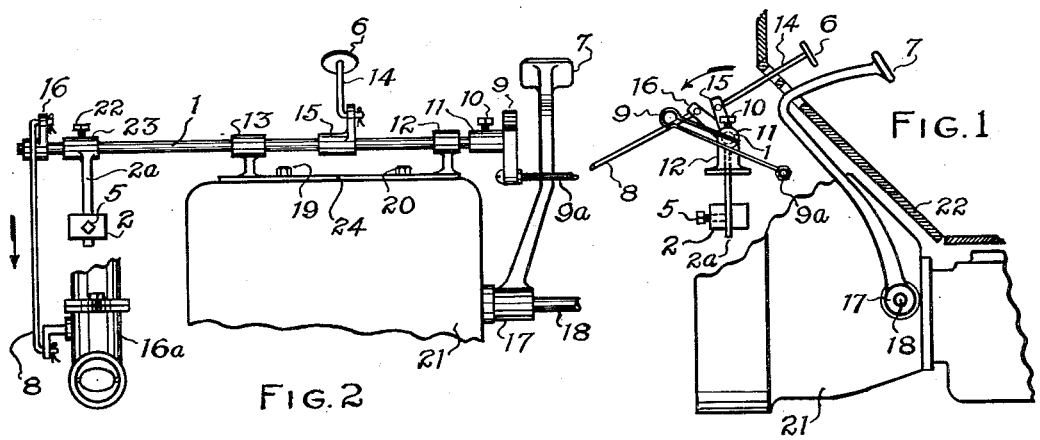
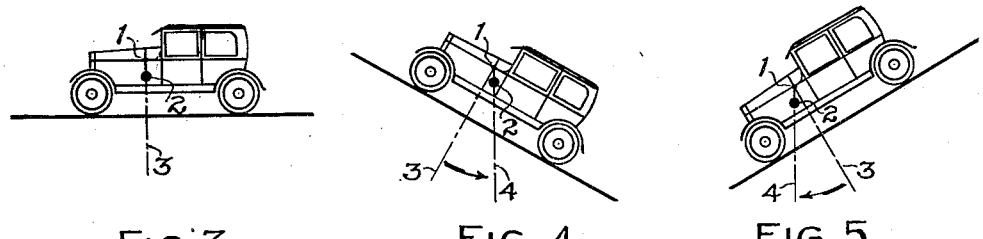
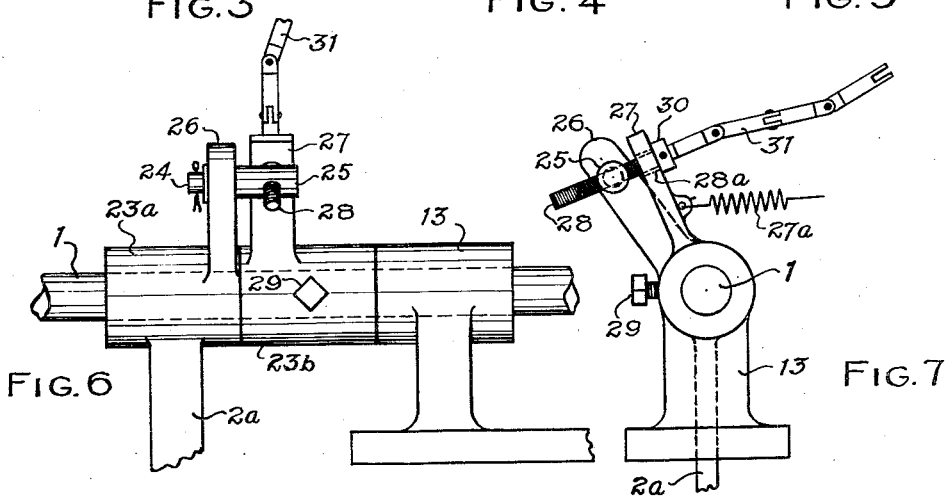
WITNESSES:
B. A. Greene.
E. C. Slagle.
INVENTOR
Edward H. Lange Patented May 31, 1932

1,861,018

UNITED STATES PATENT OFFICE

EDWARD H. LANGE, OF BALTIMORE, MARYLAND

AUTOMATIC POWER CONTROL MECHANISM FOR AUTOMOBILES

Application filed November 23, 1931. Serial No. 576,885.

This invention relates to a system for controlling the power delivered by the engine in an automobile, in relation to the grade upon which the automobile rests or moves, and in relation to the position of the brakes or the clutch, or both, that is in relation to their engaged or disengaged position, and more particularly to a mechanism by means of which the power of the engine is automatically increased upon reaching an up-grade, and automatically decreased upon reaching a down-grade, and by means of which the power is reduced to the idle power of the engine when the brakes are applied or the clutch disengaged, and increased when the brakes are released or the clutch engaged upon a level or an up-grade.

The principal object of this invention is to provide a device which is simple in structure and readily applied to present types of automobile, by means of which the power of the engine is increased to a certain excess above the idle power of the engine when the brakes are released, or the clutch engaged, and by means of which the power of the engine is reduced to the idle power when the brakes are applied or the clutch disengaged. Another object of this invention is to provide a device by means of which the excess power referred to, is automatically proportioned to the grade upon which the automobile rests or moves. A further object of this invention is to provide a device by means of which the excess power of the engine above the idle power can be readily adjusted while the automobile is in motion, to a desirable value for a level plane, so that upon reaching an up-grade the power will be proportionally increased above the desirable value for a level plane, and upon reaching a down-grade the power will be decreased below the desirable value for a level plane, and reduced to the idle power of the engine at a specified amount of down-grade. By means of this invention, attention of the operator to the power-control is greatly reduced, for example, in starting an automobile which has been brought to rest upon an up-grade; the mechanism can be adjusted to provide adequate power without attention to the power-control, and provides means for selective increase of power by the operator.

With the above objects in view, this invention consists of the matters hereinafter set forth and more particularly pointed out in the appended claims, reference being had to the accompanying drawings.

In the drawings, Fig. 1 shows a side view of the power-control mechanism and brake operating lever, Fig. 2 shows a front view of the power-control mechanism and brake operating lever, Fig. 3 shows the orientation of the balance weight when the automobile is on a level plane, Fig. 4 the orientation of the balance weight when the automobile is on an up-grade, Fig. 5 the orientation which the balance weight tends to assume when the automobile is on a down-grade, Fig. 6 shows a front view of an improved form of power compensator, and Fig. 7 shows a side view of the same power compensator.

Referring to Fig. 1, at 21 is shown the clutch housing, at 18 the shaft about which the brake operating lever 7 turns, and at 17 the bearing of the brake operating lever. The clutch operating shaft 18 serves only as a support for the brake operating lever 7, and the connections of the brake operating lever with the brakes are omitted for simplicity of illustration, however it is understood that the brakes of the automobile are applied as the lever 7 is deflected to the left. At 6 is a button attached to the rod 14, which actuates the lever 15, the elements 6, 14, and 15 comprising a floor-lever for the selective control of the throttle. At 1 is a cross-shaft supported by bearings 12 and 13, only 12 being evident in Fig. 1, and the bearings are supported by the top of the clutch housing 21, the top portion being removed in Fig. 1 for simplicity of illustration. Fixed to the cross-shaft 1 are the levers 15, 16, and the flexible lever 9, also the arm 2a which support the balance weight 2. The balance weight 2 is slotted so that it can be slipped over the arm 2a, and adjustably fastened by the set-screw 5. One end of the flexible lever 9 is secured to the hub 11, the hub being adjustably secured to the cross-shaft by the set-screw 10; the other end of the arm 9 is attached to the rod 9a which is arranged to engage the brake operating lever 7 in a manner subsequently described. At 22 are the floor-boards.

Referring to Fig. 2, a front view of the mechanism is shown, viewed from the front of the automobile toward the rear. At 16a is shown the carburetor, which is controlled by the rod 8 and lever 16. The carburetor is assumed to be provided with a stop for limiting the minimum power of the engine to the idle power, in a manner well understood, and commonly provided. At 19 and 20 are shown the screws which secure the cross-shaft bearings 12 and 13 to the top of the clutch housing, and at 22 a set-screw for securing the hub 23 of the arm 2a to the cross-shaft. The bearings 12 and 13 are a part of the common member shown at 24.

Referring to Fig. 3, Fig. 4, and Fig. 5, at 1 is indicated in schematic form the position of the cross-shaft, at 2 the position of the balance weight, at 3 a line perpendicular to the particular incline upon which the car rests, and at 4 a vertical line parallel with the force of gravity.

The rod 9a is so adjusted in relation to the brake operating lever 7, that rod 9a engages the lever 7 before this lever has reached the full extent of its travel to the left. The direction of cross-shaft rotation for increasing the engine power is shown by the arrow in Fig. 1. With the device thus far described, and shown in Fig. 1 and Fig. 2, the set-screw 22 is assumed to be tightened upon the cross-shaft when the arm 16 and cross-shaft are in the position corresponding to the idle power of the engine, that is the minimum power of the engine when the engine is not under a load, and the arm 2a in its natural position as determined by the force of gravity, the automobile being upon a level plane as in Fig. 3. When the automobile reaches an incline, as for example in Fig. 4 in which an up-grade is shown, the balance weight 2 turns in such a direction as to increase the flow of fuel to the engine, and the engine power is increased. The extent to which the power is increased depends upon the amount of the up-grade. The flexible lever 9 is turned so as to cause the rod 9a to approach the brake operating lever 7. As the brake operating lever 7 is deflected to apply the brakes, the rod 9a is engaged, and the cross-shaft is returned to its normal position at which only the idle power of the engine is developed. When it is desired to start up the grade, the brakes are released, and the balance weight permitted to swing back to its proper position corresponding to the grade upon which the automobile is started. When the incline is a down-grade, as shown for example in Fig. 5, the balance weight tends to turn in such a direction as to decrease the power to the idle power of the engine; the balance weight under this condition turns until the rotation of the cross-shaft is limited by the stop provided at the carburetor. Provision is made for the increasing travel of the brake operating lever as the brakes wear, and as a greater total deflection of the lever 7 becomes necessary to completely apply the brakes. The flexible lever 9 is so constructed that the force necessary to displace the balance weight 2 is insufficient to cause more than a very small flexure of the lever, however, when the cross-shaft has been turned to its limited position, the flexible lever 9 permits further travel of the rod 9a due to engagement with the brake operating lever. By means of the button 6, the power can be increased at will, by the operator.

Referring to Fig. 6 and Fig. 7, a mechanism is shown by means of which the cross-shaft can be advanced relative to the balance weight, while the automobile is in operation. At 1, is shown the cross-shaft, and at 13 one of the cross-shaft bearings. At 2a is the arm for supporting the balance weight. The hub 23a of the arm 2a is free to turn about the cross-shaft, and the hub carries the arm 26. Adjacent to the hub 23a is the sleeve 23b which carries the arm 27, through which the screw 28 fits loosely. The screw 28 fits loosely through the hole 28a, and is screwed into the member 25 which is free to turn in the arm 26. The end 24 of the member 25 is secured in the arm 26 by a cotter pin. The sleeve 23b is secured to the cross-shaft by the set-screw 29. Fixed to one end of the screw 28 is the head 30 which engages the arm 27, and fixed to the head 30 is the flexible shaft 31. The flexible shaft 31 is of very light construction, and is for the purpose of turning the screw 28, from a convenient location within the automobile, as for example a position upon the steering-post or instrument panel. The flexible shaft is intended to be connected to a rod which supports one end of the flexible shaft, so that only a short section of flexible shaft is required to permit the necessary displacement of the arm 26. The spring 27a is attached to the arm 27 and to a fixed point in the structure of the automobile, as for example to an arm fixed to the bearing 13. The purpose of the spring 27a is to insure positive engagement of the arm 27 with the head 30 when the arm 2a is turned in the clock-wise direction. The position of the arm 27 shown, is for the minimum or idle power of the engine. As the screw 28 is tightened, the arm 27 and cross-shaft are turned so as to increase the power of the engine, and since the force required to displace the spring 27a is small in comparison with the force required to displace the arm 26 the same amount, the position of the arm 26 is practically unchanged. This invention also contemplates the use of a pin through the screw 28 at the side of the lever 27 opposite the head 30, for securing positive engagement of the head 30 and lever 27. When the automobile reaches an up-grade, the power is increased above the fixed excess which has been provided by tightening the screw 28. When the automobile reaches a down-grade, the power is decreased, and when the amount of the grade, or angle of the grade equals the angle of advancement of the arm 27 from the position of idle power, the power of the engine is reduced to the idle power of the engine.

Having thus described the operation of this invention with reference to the brake operating lever 7, the operation with reference to a clutch operating lever is apparent. The clutch operating shaft 18 is understood to be for the purpose of mounting a clutch operating lever, in close proximity to the brake operating lever, the clutch operating lever having a normal position when the clutch is engaged, coincident with the position shown in Fig. 1 for the brake operating lever. The rod 9a is extended to engage the clutch operating lever in the same manner as described with reference to the brake operating lever. When the clutch is disengaged by deflecting the clutch operating lever to the left, the power of the engine is reduced to the idle power of the engine, and as the clutch is engaged the power of the engine is increased to an amount determined by the grade and by the adjustment of the screw 28. An important feature of this invention is the simple means for providing a temporary excess of power necessary to set the automobile in motion in the forward direction as the clutch is sufficiently engaged to start forward acceleration of the automobile. Forward acceleration causes the pendulum to swing backward relative to the automobile, and to increase the power temporarily during the period of acceleration; after the motion has become uniform the steady power is fixed by the grade and the screw 28.

Another important feature of this invention is the simple means for automatically increasing the power setting in relation to the inclination of the chassis caused by excess loading of the rear of the automobile. Inclination of the chassis from the front downward toward the rear, caused by excess loading of the rear, has the same effect as an equivalent up-grade.

Although the system of power-control disclosed has been described with specific reference to the operation of the flexible lever 9 by a brake operating lever and clutch operating lever each having the form of a pedal, it is obvious that the flexible lever 9 can be located in some other convenient position and connected with the cross-shaft by linkage. Such an arrangement is anticipated for example in connection with the brake operating mechanism disclosed in a pending application, Serial Number 565,492, the title of which is Brake-control system, and in connection with the clutch operating mechanism disclosed in a pending application, Serial Number 560,402, the title of which is Clutch-control system.

By means of this invention, when the brakes are applied, and the clutch is allowed to remain engaged, as for example in slowing down, the power of the engine is reduced; when the brakes are not engaged, and the clutch is disengaged, as for example in starting up and in shifting gears, the power of the engine is reduced to the idle power, and increased as the clutch is allowed to engage.

The arrangement of the balance weight herein described, as a pendulum vertically suspended from the transverse shaft, provides a maximum lever arm for the inertia force which is initiated upon starting the automobile, and thereby utilizes to maximum advantage the forward acceleration of the automobile for supplying additional power preliminary to shifting gears, while getting the automobile under way. This arrangement provides also, a minimum lever arm for the vertical inertia force upon the balance weight initiated by irregular portions of the road, and thereby substantially eliminates the undesirable control of the engine power by such irregular portions of the road. In addition to these advantages, the arrangement of the balance weight shown, provides a gravity balanced system in which the angle of the grade is definitely related to the vertically stabilized balance weight, and the constancy of the throttle opening in relation to the grade is thereby conditioned to a minimum extent upon variable restraining or balancing forces.

Obviously, changes may be made in the construction and arrangement of parts, without departing from the spirit of my invention, and I do not therefore limit myself to the form or arrangement shown.

What is claimed is:

1. In an automobile, the combination of an engine, a first means operable by foot for controlling the power of the engine, a pendulum means for automatically controlling the power of the engine in response to the grade upon which the automobile rests, a third means operable by the brakes for controlling the power of the engine as the brakes are applied or released, and adjustable means for regulating the minimum power desired upon a level plane in excess of the idle power of the engine, said pendulum means increasing the power of the engine upon an up-grade in proportion to the grade, decreasing the power of the engine upon a down-grade to the said idle power, maintaining the power of the engine upon a level plane at the said minimum power desired, and providing minimum power response to vertical motion of the automobile, said third means causing the power of the engine to be decreased as the brakes are applied and to be increased as the brakes are released, the power being decreased to said idle power upon full application of the brakes, and increased to the power which existed before application of the brakes when the grade is the same upon release of the brakes, said first means providing for the selective increase of power by the operator in excess of the power provided by the pendulum means and the adjustable means for regulating the minimum power desired upon a level plane.

2. In an automobile, the combination of an engine, a primary means for manually controlling the power of the engine, a vertically stabilized secondary means for automatically controlling the power of the engine in relation to the inclination of the automobile to a level plane, means operable in conjunction with the brakes for decreasing the power of the engine as the brakes are applied and increasing the power as the brakes are released, and adjustable means for regulating the minimum power of the engine upon a level plane when the brakes are completely released, in relation to the idle power of the engine when the brakes are completely applied.

3. In an automobile, the combination of an engine, a pendulum mechanism for controlling the power of the engine in proportion to the grade, increasing the power upon an up-grade above an adjusted minimum power, decreasing the power upon a down-grade to the idle power, and maintaining the power upon a level at said adjusted minimum power, a foot operable mechanism for selectively increasing the power, a mechanism operable by the brake operating lever when the clutch is engaged, for decreasing the power to the idle power as the brakes are applied and increasing the power to a proportioned value as the brakes are released, and operable by the clutch operating lever when the brakes are released, for decreasing the power to the idle power as the clutch is disengaged and increasing the power to said proportionate value as the clutch is engaged, said proportioned value being determined by the pendulum mechanism for the particular grade upon which the automobile rests or moves, and an adjustable mechanism for readily regulating the said adjusted minimum power, while the automobile is in motion.

4. In an automobile, an automatic power-control system comprising a pendulum mechanism for controlling the power in proportion to the grade, proportionally increasing the power on an up-grade above an adjusted minimum power, decreasing the power on a down-grade below said adjusted minimum power, and maintaining the power on a level at said adjusted minimum power, a foot operable mechanism for selectively increasing the power, a mechanism operable by the brake lever when the clutch is engaged, for decreasing the power to the idle power when the brakes are applied, and increasing the power to a proportioned value as the brakes are released, and operable by the clutch lever when the brakes are released, for decreasing the power to the idle power when the clutch is disengaged, and increasing the power to said proportioned value when the clutch is engaged, said proportioned value being set by the pendulum mechanism for the existing grade, and an adjustable mechanism for regulating said adjusted minimum power to a desirable value in excess of the idle power.

5. In an automobile, an automatic power control system comprising a gravity responsive vertically directed mechanism for controlling the power of the engine in relation to the grade, proportionally increasing the power upon an up-grade above an adjusted minimum power, decreasing the power upon a down-grade to the idle power of the engine, and maintaining the power upon a level at said adjusted minimum power, a foot operable means for selectively increasing the power above that provided by said gravity responsive mechanism, a mechanism operable by the brake operating lever for decreasing the power upon full application of the brakes to the idle power of the engine, and increasing the power upon complete release of the brakes to a value provided by the gravity responsive vertically directed mechanism for the existing grade when the brakes are released, and an adjustable mechanism for readily regulating the said adjusted minimum power to a desirable amount upon a level, while the automobile is in motion.

6. In an automobile, the automatic power control mechanism comprising a cross-shaft attached by linkage to the carburetor, a floor-lever attached to the cross-shaft, a flexible arm adjustably attached to the cross-shaft and arranged to engage the brake operating lever, and a pendulum fixed to the cross-shaft, whereby the power is automatically and proportionally increased above a minimum upon an up-grade, reduced to said minimum upon a down grade, and maintained at said minimum upon a level by the pendulum, whereby the power is reduced to said minimum upon complete application of the brakes by said brake operating lever, and proportionally increased upon release of said brake operating lever upon an up-grade, and whereby power in excess of that provided by the orientation of said pendulum can be selectively controlled by said floor-lever.

7. In an automobile, the combination of an engine, a primary means for manually controlling the fuel supplied to the engine, a vertically stabilized secondary means for automatically controlling the fuel supplied to the engine, said secondary means being responsive to the amount of inclination of the automobile to a level plane, means operable in conjunction with the brakes for decreasing the fuel supplied to the engine as the brakes are applied, and increasing the fuel supplied to the engine as the brakes are released, and adjustable means for regulating the minimum fuel supplied to the engine when the automobile is on a level plane.

8. In an automobile, the combination of an internal combustion engine, a primary means operable by foot for controlling the flow of fuel to the engine, a secondary means having a pendulum for automatically controlling the flow of fuel to the engine, means operable by the brakes for controlling the flow of fuel to the engine upon operation of the brakes, and adjustable means for regulating the minimum flow of fuel to the engine when the automobile is on a level plane, said secondary means being responsive to the grade, incresing the flow of fuel upon an up-grade in proportion to the grade, decreasing the flow of fuel upon a down-grade to a predetermined minimum, and controlling the flow of fuel upon a level plane to a minimum adjusted by said adjustable means for regulating the minimum flow, said minimum flow being equal to, or in excess of said predetermined minimum, and said means operable by the brakes for controlling the flow of fuel causing the flow of fuel to be decreased as the brakes are applied and increased as the brakes are released, the flow being reduced to said predetermined minimum upon full application of the brakes, and increased upon complete release of the brakes to the same flow which existed before application of the brakes, when the grade is the same upon release of the brakes as upon application of the brakes.

9. In an automobile, the power control mechanism comprising a cross-shaft attached by linkage to the carburetor, a floor-lever attached to the cross-shaft, a flexible arm adjustably connected to the cross-shaft and arranged to engage the brake operating lever, and a power compensator, said power compensator comprising a pendulum suspended from the cross-shaft and free to turn about the cross-shaft, a sleeve fixed to the cross-shaft and coupled to the pendulum by a screw, by means of which the sleeve is constrained to turn with the pendulum in the direction of cross-shaft rotation which increases the engine power, and free to turn relative to the pendulum in the direction of cross-shaft rotation which decrease the engine power, a spring for returning the sleeve to the normal position of minimum idle power of the engine, and a flexible shaft attached to said screw, whereby the power of the engine upon a level can be adjusted equal to or greater than the idle power of the engine, the power upon an up-grade automatically increased in proportion to the grade, and the power upon a down-grade automatically decreased to the said idle power; whereby the power is decreased to said idle power upon application of the brakes and increased upon release of said brakes to a value determined by the grade; and whereby power required in excess of the above said power can be selectively controlled by means of said floor-lever.

10. In an automobile, a vertically stabilized mechanism for controlling the power developed by the engine upon a level plane, an up-grade and a down-grade, and means for controlling said vertically stabilized mechanism connected with the brake operating lever upon operation of said lever, whereby the power developed by the engine upon complete application of the brakes is reduced to the minimum idle power of the engine, and whereby the power developed by the engine upon release of the brakes upon an up-grade is greater than the power developed by the engine upon release of the brakes upon a level plane.

11. In an automobile, the combination of a pendulum for readily adjusting the power of the engine in excess of the idle power, increasing said excess automatically when the automobile reaches an up-grade, and decreasing said excess automatically when the automobile reaches a down-grade, and a mechanism operable by the clutch operating lever for reducing said excess when the clutch is disengaged.

12. An automobile power control mechanism comprising a cross-shaft attached by linkage to the carburetor, a floor-lever attached to the cross-shaft, a flexible arm adjustably connected to the cross-shaft and arranged to be engaged by the brake operating lever upon application of the brakes, and a power compensator, said power compensator comprising a sleeve fixed to the cross-shaft, a pendulum suspended from said cross-shaft and free to turn about the cross-shaft, a screw loosely fitting through an arm of said sleeve and screwed into an arm of said pendulum, a flexible shaft attached to said screw, and a spring connected between the said arm of said sleeve and a fixed point in the structure of the automobile, said spring returning the cross-shaft to a position providing for the idle power of the engine when said sleeve is not constrained to turn with the pendulum, whereby the power of the engine upon a level can be readily adjusted while the automobile is in motion, to a fixed excess above said idle power, the power upon an up-grade automatically increased in proportion to the grade, and the power upon a down-grade automatically decreased below said fixed excess; whereby the power is decreased to said idle power upon application of the brakes and increased upon release of the brakes to a value determined by the grade; and whereby power required in excess of any of the above said power can be selectively controlled by means of said floor-lever.

13. An automobile power control system comprising a mechanism connected with the throttle of the engine for adjusting the power of the engine to a fixed excess above the idle power of the engine, and having flexible shaft means for readily changing said fixed excess while the automobile is in motion, a mechanism containing a flexible arm connected with the throttle and arranged to be actuated by the brake operating lever for reducing said fixed excess to said idle power when the brakes are applied, and a proportioning mechanism containing a pendulum connected with the throttle for automatically adjusting the power upon release of the brakes to a value equal to said fixed excess when the automobile is on a level, to a value less than said fixed excess when the automobile is on a down-grade, and to a value proportionally greater than said fixed excess when the automobile is on an up-grade said proportionally greater value being proportional to the amount of the grade.

14. An automobile power control system comprising a throttle, a clutch, a brake and a pendulum adjustably mounted upon a transverse shaft connected with the throttle of the engine, by means of which the power is automatically and momentarily increased above a predetermined minimum during the forward acceleration of the automobile as the clutch is engaged, automatically increased upon an up-grade above said predetermined minimum power, and reduced upon a down-grade below said predetermined minimum power, and by means of which undesirable variation of power caused by vertical motion of the automobile is reduced to a minimum, and means for reducing the power below said predetermined minimum when the brake is applied or the clutch is disengaged.

15. An automobile power control system comprising a pendulum, a throttle, a brake operating lever, and a clutch operating lever, said pendulum being mounted upon a transverse shaft connected with the throttle of the engine and arranged to provide minimum power when the automobile is on a level plane, and a mechanism connected with the transverse shaft operable by the clutch operating lever or the brake operating lever, by means of which the power is automatically increased by a maximum power impulse as the clutch is engaged and as the forward acceleration of the automobile causes a temporary displacement of the pendulum, by means of which the power is automatically increased upon an up-grade above said minimum power by an amount proportional to the grade, and automatically decreased upon a down-grade to said minimum power, and by means of which the power can be selectively reduced to said minimum power upon disengagement of the clutch or upon application of the brake.

16. In an automobile, the combination of a throttle, a clutch operating lever, a brake operating lever, a pendulum connected with the throttle of the engine, and a mechanism connected with the throttle of the engine operable by the brake operating lever or the clutch operating lever, whereby the power is temporarily increased as the clutch is engaged for forward acceleration of the automobile, and variation of power caused by vertical acceleration is reduced to a minimum, whereby the power is automatically increased upon an up-grade and automatically decreased upon a down-grade, and whereby the power can be selectively decreased by the brake operating lever or the clutch operating lever.

17. In an automobile, the combination of an engine, a clutch, a throttle and a pendulum connected with the throttle of the engine, by means of which the power of the engine is temporarily and automatically increased as the clutch is allowed to engage and cause forward acceleration of the automobile, by means of which the power is automatically increased upon an up-grade in proportion to the amount of the grade, and automatically decreased upon a down-grade below the power upon a level plane, and by means of which the power is automatically increased as the longitudinal axis of the automobile is inclined from the front of the automobile toward the rear by increased loading of the rear of the automobile.

18. An automobile power control system having a throttle, a clutch, a brake, and a pendulum adjustably attached to a transverse shaft which is operatively connected with the throttle of the engine, by means of which the power of the engine is temporarily increased as the clutch is allowed to engage and cause forward acceleration of the automobile, by means of which the power is increased automatically upon an up-grade in proportion to the amount of the grade, and decreased upon a down-grade below the power upon a level plane, and means for selectively reducing the power of the engine upon application of the brake or upon disengagement of the clutch.

19. In an automobile having a clutch control member, a brake control member, and a throttle, a pendulum adjustably connected with the throttle, establishing an excess of power above the idle power, automatically increasing said excess on an up-grade and decreasing said excess on a down-grade, and a mechanism operable by the clutch control member or the brake control member and connected with the throttle for reducing the power to the idle power.

20. In an automobile, the combination of a clutch control member, a brake control member, a throttle, a pendulum adjustably and operatively connected with the throttle, regulating said throttle to provide power in excess of the idle power, automatically increasing said excess on an up-grade and decreasing said excess on down-grade, and means connected with the throttle selectively operable by the clutch control member or the brake control member for reducing the power to the idle power.

21. In an automobile, the combination of an engine, a throttle, a brake control member, a clutch control member, a pendulum mounted upon a transverse shaft operatively connected with the throttle, an arm attached to said transverse shaft selectively operable by the brake control member or the clutch control member for closing the throttle, and means for selectively increasing the amount of opening of the throttle.

22. An automobile power control system comprising a throttle, a clutch control member, a brake control member, a pendulum operatively and adjustably attached to a transverse shaft connected with the throttle, an arm attached to said transverse shaft operable by the clutch control member or the brake control member, and a floor-lever operatively connected with said transverse shaft, whereby power in excess of the idle power is provided when the automobile is at rest or in uniform motion on a level, said excess is automatically increased on an up-grade and decreased on a down-grade, and selectively reduced to the idle power upon application of the brakes or upon disengagement of the clutch, or selectively increased by the floor-lever; and whereby said excess is automatically increased during the forward acceleration of the automobile, and power variation caused by vertical acceleration of the automobile due to irregular portions of the road, is reduced to a minimum.

23. In an automobile, the combination of a clutch control member, a brake control member, a throttle, a pendulum adjustably attached to a transverse shaft which is operatively connected with the throttle, an arm attached to said transverse shaft selectively operable by the clutch control member or the brake control member, and a floor-lever operatively connected with the transverse shaft, whereby the power is automatically increased above a minimum upon an up-grade, and during forward acceleration of the automobile, decreased below said minimum automatically on down-grade, selectively decreased below said minimum upon application of the brakes or upon disengagement of the clutch, or selectively increased by means of said floor-lever; and whereby power variations caused by vertical acceleration of the automobile due to irregular portions of the road, are reduced to a minimum.

24. In an automobile, the combination having a clutch control member, a brake control member, a throttle, a transverse shaft operatively connected with the throttle, a floor-lever operatively connected with said transverse shaft, an arm attached to said transverse shaft operable by the clutch control member or the brake control member, and a vertically stabilized member attached to and supported by said transverse shaft.

In witness whereof I have hereunto set my hand this 23rd day of November, 1931.

EDWARD H. LANGE.